(12) United States Patent
Straub et al.

(10) Patent No.: US 9,917,690 B2
(45) Date of Patent: Mar. 13, 2018

(54) ENCRYPTION MANAGEMENT, CONTENT RECORDING MANAGEMENT, AND PLAYBACK MANAGEMENT IN A NETWORK ENVIRONMENT

(71) Applicant: Time Warner Cable Enterprises LLC, New York, NY (US)

(72) Inventors: Albert Straub, Westminster, CO (US); John Chen, Ashburn, VA (US); Thomas Gonder, Broomfield, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 14/872,235

(22) Filed: Oct. 1, 2015

(65) Prior Publication Data
US 2017/0099136 A1  Apr. 6, 2017

(51) Int. Cl.
*H04L 9/08* (2006.01)
*H04L 29/06* (2006.01)

(52) U.S. Cl.
CPC ........ *H04L 9/0819* (2013.01); *H04L 63/0428* (2013.01); *H04L 63/062* (2013.01); *H04L 2209/601* (2013.01); *H04L 2209/603* (2013.01); *H04L 2463/101* (2013.01)

(58) Field of Classification Search
None
See application file for complete search history.

(56) References Cited

U.S. PATENT DOCUMENTS

| | | | | |
|---|---|---|---|---|
| 2007/0198414 A1* | 8/2007 | Derrenberger | .......... | G06F 21/10 705/51 |
| 2013/0227283 A1* | 8/2013 | Williamson | .......... | H04L 9/0825 713/168 |
| 2013/0227284 A1* | 8/2013 | Pfeffer | ................ | H04L 63/0236 713/168 |
| 2014/0237520 A1* | 8/2014 | Rothschild | ........... | H04N 21/236 725/88 |
| 2015/0121417 A1* | 4/2015 | Vince | ................ | H04N 21/25816 725/31 |
| 2016/0269457 A1* | 9/2016 | Tiraspolsky | ............ | H04L 65/60 |

* cited by examiner

*Primary Examiner* — Saleh Najjar
*Assistant Examiner* — Michael Chao
(74) *Attorney, Agent, or Firm* — Chapin IP Law, LLC

(57) ABSTRACT

Management of key information as described herein enables a respective service provider to distribute encrypted content to subscribers, preventing improper use of the content without authorization. For example, the service provider can distribute encrypted content for recording by a subscriber at a remote location. At or around a time of recording the encrypted content, and on behalf of the user, the service provider initiates storage of the corresponding decryption information that is needed to decrypt the recorded encrypted content. In order to play back the recorded segments of the encrypted content, the subscriber communicates with a server resource to be authenticated. Subsequent to being authenticated, the server resource distributes a copy of decryption information needed to decrypt the previously recorded segments of encrypted content to the subscriber. Accordingly, the service provider retains control of playing back content via controlled distribution of the corresponding copy of decryption information.

29 Claims, 8 Drawing Sheets

CONTENT ACCESS INFO. 185-1

| RESOURCE LOCATOR | SEG. OF ENCRYPTED CONTENT | RESOURCE LOCATOR | DECRYPTION KEY INFO. |
|---|---|---|---|
| (RL11) | SOEC #1 | (RL21) | E(D_KEY1) |
| (RL12) | SOEC #2 | (RL22) | E(D_KEY2) |
| (RL13) | SOEC #3 | (RL23) | E(D_KEY3) |
| (RL14) | SOEC #4 | (RL24) | E(D_KEY4) |
| ... | ... | ... | ... |

FIG. 2

| CONTENT ACCESS INFO. 185-2 | | | |
|---|---|---|---|
| RESOURCE LOCATOR | SEG. OF ENCRYPTED CONTENT | RESOURCE LOCATOR | DECRYPTION KEY INFO. |
| (RL31) | SOEC #1 | (RL41) | E(D_KEY1) |
| (RL32) | SOEC #2 | (RL42) | E(D_KEY2) |
| (RL33) | SOEC #3 | (RL43) | E(D_KEY3) |
| (RL34) | SOEC #4 | (RL44) | E(D_KEY4) |
| ... | ... | ... | ... |

FIG. 3

ENCRYPTION MANAGEMENT, CONTENT RECORDING MANAGEMENT, AND PLAYBACK MANAGEMENT IN A NETWORK ENVIRONMENT

BACKGROUND

In general, digital rights management refers to a field of access control technology that attempts to prevent against improper use of proprietary content such as video, audio, etc.

One way to prevent misappropriation of proprietary content is to encrypt the content before it is made available or distributed over a network to an end user operating a playback device. By itself, encrypted content is not particularly useful because it must first be decrypted in order to play it back on a respective playback device. In order to enable a subscriber to play back encrypted segments of a title of content, it is required to provide the respective user of the playback device one or more decryption keys along with the encrypted content such that the playback device is able to decrypt the encrypted content and play back the original content on a respective display screen.

In certain instances, conventional techniques enable a respective client device to retrieve encrypted content and then, via trans-cryption, store a re-encrypted version of the content for later use. However, in such an instance, this requires the client device to decrypt the content using appropriate decryption keys and then apply new encryption to the content prior to storing it for later use. This is often undesirable because of the time requested to decrypt and encrypt again.

BRIEF DESCRIPTION OF EMBODIMENTS

In contrast to conventional techniques, embodiments herein provide a novel way of managing recordings of encrypted content as well as corresponding (decryption) key information needed to decrypt the recorded content.

More specifically, as an illustrative example, assume that a user operated communication device (such as a client device) receives input from a respective user identifying content to be recorded. To record the selected content, the user operated communication device receives first content access information (such as manifest file information) indicating one or more resources from which to retrieve encrypted segments of the selected content. In one embodiment, the first content access information further specifies resources such as corresponding one or more locations from which to retrieve original decryption key information (such as one or more decryption keys) needed to decrypt the retrieved segments of encrypted content. As specified by the first content access information, the user operated communication device retrieves the segments of encrypted content and further initiates storage of the retrieved segments of encrypted content in a first repository for later retrieval.

In addition to initiating storage of the encrypted segments of content, the user-operated communication device initiates storage of copies of the original decryption keys (original decryption key information) needed to decrypt the encrypted segments of content for later retrieval. In one example embodiment, this includes notifying a remote server resource to store copies of the original decryption key information on behalf of the subscriber for later use.

In accordance with further embodiments, in response to receiving the notification to store the decryption key information, and on behalf of the subscriber, the remote server resource operated by a service provider (such as an entity distributing the encrypted segments of content) stores the copies of the original decryption keys at a remote location with respect to the user operated communication device. The service provider controls subsequent access to the copies of the original decryption key information such that the previously recorded segments of the encrypted content are not used in an improper manner. In other words, as further discussed below, controlling access to the copies of the original decryption keys prevents improper decryption and further distribution of the unencrypted content by unauthorized parties.

Subsequent to recording of the segments of encrypted content, assume that the user operated communication device receives input such as a request from a corresponding subscriber to play back the previously recorded segments of encrypted content. In such an instance, the user operated communication device retrieves second content access information indicating where the previously stored segments of encrypted content and copies of the decryption keys are located. In one embodiment, the second content access information is generated at or around a time of recording the segments of encrypted content. The generated second content access information indicates locations where the recorded segments of encoded content are stored as well as locations where the corresponding copies of the decryption keys are stored.

Using the second content access information, subsequent to recording, the user-operated communication device initiates retrieval of the stored segments of encoded content and corresponding decryption keys.

In accordance with yet further embodiments, the service provider stores the copies of the decryption keys in a secure location with respect to the subscriber requesting recording of the content. To obtain the copies of the decryption keys (decryption key information) as specified by the second content access information, the user operated communication device communicates credentials to an authentication server resource operated by the service provider. Subsequent to authentication/verification of the subscriber by the authentication server resource, the user-operated communication device receives the copies of the original decryption key information associated with the stored segments of encrypted content. The user operated communication device then applies the received copies of the original decryption keys to the appropriate one or more segments of recorded encrypted content to decrypt the previously recorded segments of the encrypted content for playback on a respective playback device (such as a display screen, speaker, etc.).

Note that embodiments herein can be implemented in any of multiple different types of digital management applications. For example, in one embodiment, the subscriber subscribes to use of an Internet Protocol Digital Video Recorder (IP-DVR) in which the IP-DVR simply records segments of encrypted content such as live streams of data received on a playback device such as an I-Pad™, computer device, Roku™ device, etc. In one embodiment, the encryption keys associated with the live stream rotate (e.g., old keys are swapped for new keys) on a time basis and expire on a time basis.

As described herein, in addition to storing encrypted content that is at least temporarily available to the subscriber, one embodiment includes the ability to request recording of decryption key information such as one or more decryption keys. The copy of decryption keys covers a corresponding time period in which the corresponding segments of encrypted content are recorded. After the first content access information has expired, the second content access information provides a mapping of the new locations of the different segments of the encrypted content to corresponding new locations of the decryption keys such that the retrieved decryption key information can be used to decrypt and playback the corresponding segments of encrypted content on a playback device.

Embodiments herein are useful over conventional techniques. For example, management of decryption key information as described herein enables a respective service provider to distribute encrypted content to subscribers, preventing improper use of the content. That is, as previously discussed, the service provider can distribute encrypted content for recording by a subscriber. At or around a time of recording the encrypted content on behalf of the user, the service provider stores corresponding decryption information that is needed to decrypt the recorded encrypted content. In order to play back the recorded segments of the encrypted content, the subscriber communicates with the server resource controlled by the service provider to retrieve a copy of decryption information needed to decrypt the previously recorded segments of encrypted content. Accordingly, the service provider retains control of playing back content via controlled distribution of the corresponding copy of decryption information.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment as described herein includes a computer readable storage medium, system, hardware, etc., having instructions stored thereon. The instructions, when executed by computer processor hardware, cause the computer processor hardware of the system to: retrieve segments of encrypted content as specified by first content access information, the first content access information further specifying resources from which to retrieve original decryption keys to decrypt the segments of encrypted content; store the segments of encrypted content in a first repository associated with the client device for later retrieval; and in a second repository accessible to the client device, initiate storage of copies of the original decryption keys to decrypt the encrypted segments of content for later retrieval.

Another embodiment as described herein includes computer readable storage medium, system, hardware, etc., having instructions stored thereon. The instructions, when executed by computer processor hardware, cause the computer processor hardware of the system to: receive a request to playback stored segments of encrypted content, the stored segments of encrypted content previously retrieved using first content access information indicating locations from which to retrieve the segments of encrypted content and corresponding original decryption keys to decrypt the segments of encrypted content; in response to receiving the request from the subscriber, retrieve second content access information; and utilize the second content access information to retrieve the stored segments of encrypted content and copies of the original decryption keys.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for managing distribution of encrypted content and corresponding decryption key information. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 2 is an example diagram illustrating first content access information according to embodiments herein.

FIG. 3 is an example diagram illustrating second content access information according to embodiments herein.

Figure 1:
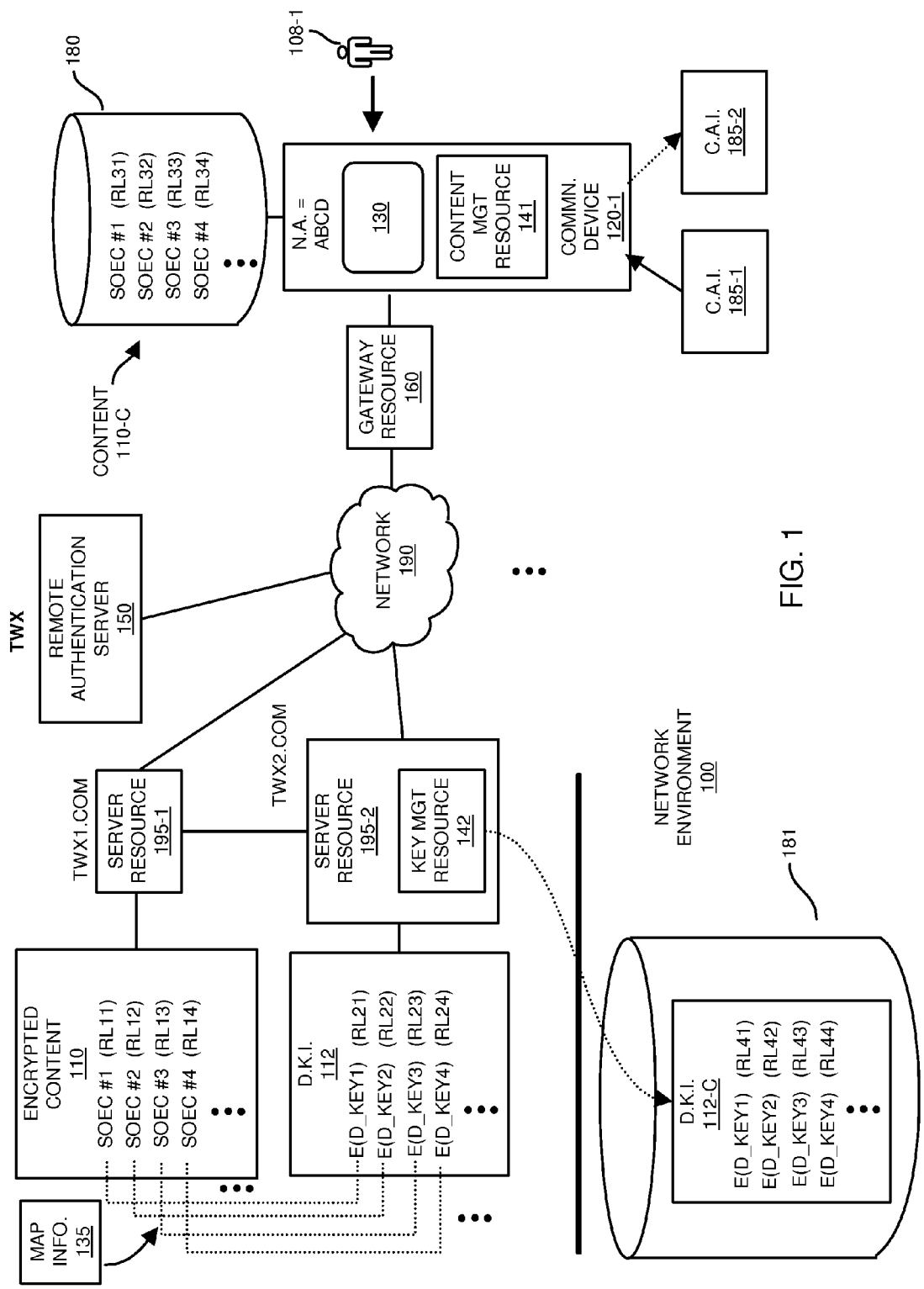
FIG. 1 is an example diagram illustrating a network environment facilitating distribution of encrypted content and management of decryption key information according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Management of key information as described herein enables a respective entity such as a service provider to distribute encrypted content to subscribers, preventing improper use of the content without authorization. That is, the service provider can distribute encrypted content for recording by a subscriber at a remote location. At or around a time of recording the encrypted content, and on behalf of the user, equipment associated with the service provider initiates storage of the corresponding decryption information that is needed to decrypt the encrypted content recorded by the subscriber. The user can initiate recording of the encrypted content in any suitable location such as in equipment operated by the user.

In order to play back the recorded segments of the encrypted content subsequent to recording, the subscriber communicates with a server resource controlled by the service provider. Subsequent to verifying credentials of the user and/or corresponding communication device, the server resource distributes a copy of decryption information needed to decrypt the previously recorded segments of encrypted content to the subscriber. Accordingly, the service provider allows recording of encrypted content, but retains control of playing back content via controlled distribution of the corresponding copy of decryption information.

Now, more specifically, FIG. 1 is an example diagram illustrating a network environment facilitating distribution of encrypted content and storing of key information for later retrieval according to embodiments herein.

As shown, network environment 100 includes communication device 120-1 (client device), gateway resource 160, network 190, remote authentication server 150, server resource 195-1, and server resource 195-2.

In this example embodiment, assume that the user 108-1 operates communication device 120-1 and subscribes to delivery services provided by service provider TWX. Services provided by service provider TWX in this example include distribution of encrypted content 110 such as video, images, audio, etc., on behalf of the user 108-1 (subscriber) upon request by the user 108-1.

In one embodiment, the content 110 is encrypted over-the-top content selected for recording by a user in a subscriber domain of a cable network environment in which the communication device 120-1 device resides, the over-the-top content scheduled for distribution in a particular timeslot as LIVE streaming content over any type of communication link such as a unicast link, multicast link, etc. In broadcasting, over-the-top content such as video, audio, etc., refers to receiving media over the Internet without the involvement of a system operator in the control or distribution of the content. An Internet service provider may be aware of content conveyed in data packets over a respective service. However, the service provider is not responsible for, nor does the service provider control use (such as display, redistribution, etc.) of the content.

Assume in this example embodiment that the user 108-1 inputs a command to the communication device 120-1 to record encrypted content 110 for later playback. In such an instance, in response to receiving the request to record encrypted content 110, the communication device 120-1 first initiates communications with remote authentication server 150 to be authenticated.

In accordance with general embodiments, the remote authentication server 150 determines whether the communication device 120-1 and corresponding user 108-1 should be allowed access to content available from any of one or more server resources associated with service provider TWX.

In one embodiment, prior to distributing content to the corresponding communication device 120-1, and in response to input from the user 108-1 requesting to use services provided by the service provider TWX, the remote authentication server 150 challenges the communication device 120-1 and/or user 108-1 to provide appropriate credentials indicating that should the user 108-1 is a subscriber that should be allowed to access the service provider's available content through gateway resource 160.

In response to receiving the request to record encrypted content 110 on behalf of user 108-1 for later viewing, the communication device 120-1 initiates retrieval of content access information 185-1 (such as manifest file information), details of which are further discussed with respect to FIG. 2.

An example of content access information 185-1 is shown in FIG. 2. In general, as shown in this example embodiment, the content access information 185-1 enables a respective user to retrieve a sequence of multiple segments of encrypted content for playback as well as for storage as described in this example. The content access information 185-1 indicates an order in which to playback the segment of encrypted content.

More specifically, the content access information 185-1 in this example embodiment includes resource locators (such as one or more pointers, network address information, URLs, etc.) indicating locations of relevant information associated with playback of content.

In one embodiment, the content access information 185-1 indicates where corresponding segments of encrypted content 110 are available for retrieval. For example, the content access information 185-1 indicates that: segment of encrypted content #1 is available for retrieval using resource locator RL11; segment of encrypted content #2 is available for retrieval using resource locator RL12; segment of encrypted content #3 is available for retrieval using resource locator RL13; segment of encrypted content #4 is available for retrieval using resource locator RL14; etc.

In one embodiment, the encrypted content 110 represents encrypted video content including multiple segments of images, audio, etc., or sequential playback.

Each of the encrypted segments of content can include one or more frames of encoded data. As mentioned above, each of the segments is encrypted using unique encryption key information for the corresponding segment of content. Map information 135 indicates an association of a respective segment of encrypted content 110 with corresponding decryption key information 112 needed to perform decryption.

Note that in addition to including resource locators indicating locations in which to retrieve segments of encrypted content associated with content 110, the content access information 185-1 further includes resource locators (such as pointers, network address information, URLs, etc.) indicating where corresponding (decryption) key information associated with each of the segments of encrypted content is available for retrieval.

For example, the content access information 185-1 indicates that: encrypted version of decryption key D_Key1 for decrypting segment of encrypted content #1 (SOEC #1) of content 110 is available for retrieval using resource locator RL21; encrypted version of decryption key D_Key2 for decrypting segment of encrypted content #2 (SOEC #2) of content 110 is available for retrieval using resource locator RL22; encrypted version of decryption key D_Key3 for decrypting segment of encrypted content #3 (SOEC #3) of content 110 is available for retrieval using resource locator RL23; encrypted version of decryption key D_Key4 for decrypting segment of encrypted content #4 (SOEC #4) of content 110 is available for retrieval using resource locator RL24; and so on.

Accordingly, content access information 185-1 in FIG. 2 includes manifest information indicating locations from which to retrieve segments of encrypted content associated with the requested content 110 as well as corresponding locations from which to retrieve corresponding decryption key information.

Referring again to FIG. 1, subsequent to retrieving the content access information 185-1, in accordance with the request to store content 110 for later retrieval, the content management resource 141 in the communication device 120-1 initiates recording of the requested encrypted content 110 on behalf of the user 108-1. In one embodiment, this includes utilizing the resource locators in the content access information 185-1 to retrieve the segments of encrypted content as well as initiate storage of the corresponding decryption key information 112 for later retrieval.

For example, as specified by the content access information 185-1, the content manager resource 141 communicates a request (to the location as specified by resource locator RL11) to retrieve segment of encrypted content #1 through gateway resource 160 over network 190 to server resource 195-1.

In one non-limiting example embodiment, the resource locator RL11 specifies a network address of or associated with server resource 195-1 from which to retrieve the segment of the encrypted content #1. Further, by way of non-limiting example embodiment, the server resource 195-1 (such as a server TWX 1.com) can be owned and/or operated by the service provider TWX.

Note that the request for segment of encrypted content #1 can include one or more data packets specifying the source as communication device 120-1 and destination as server resource 195-1 in which to deliver the requested data. Gateway resource 160 and network 190 deliver the request in accordance with any suitable network delivery protocol.

In response to receiving the request for the segment of encrypted content #1 as specified by the first entry in the content access information 185-1, the server resource 195-1 retrieves the segment of encrypted content #1 and initiates delivery of the corresponding segment of encrypted content #1 over network 190 through gateway resource 160 to the communication device 120-1. The communication device 120-1 initiates storage of the segment of encrypted content #1 in the suitable location such as repository 180.

The repository 180 can be physically located within the communication device 120-1 or a remote location that is later accessible by the communication device 120-1. Because the retrieved segment of encrypted content #1 is encrypted, it is not particularly useful without also storing the decryption key information 112, which is not available from the server resources 195 at a later time. In other words, the storage of encrypted content 110 and corresponding decryption key information 112 may expire in which such information is no longer available for retrieval from the service provider in the same manner.

In a similar manner that the content management resource 141 uses the content access information 185-1 to retrieve the segment of encrypted content #1, the content management resource 141 and communication device 120-1 utilize the subsequent entries in the second entry of the content access information 185-1 to retrieve each of the segments of encrypted content using corresponding resource locators.

For example, to retrieve the segment of the encrypted content #2, the content management resource 141 generates and transmits a request to the entity (location such as server resource 195-1) as specified by resource locator RL12 through gateway resource 160 and network 190 to server resource 195-1. In response to receiving the request, in a reverse direction, the server resource 195-1 initiates delivery of segment of encrypted content #2 over network 190 through gateway resource 160 to communication device 120-1 assigned network address ABCD. The content management resource 141 initiates storage of the retrieved segment of encrypted content #2 in repository 180.

To retrieve the segment of the encrypted content #3, the content management resource 141 generates and transmits a request to the entity (location such as server resource 195-1) as specified by resource locator RL13 through gateway resource 160 and network 190 to server resource 195-1. In response to receiving the request, in a reverse direction, the server resource 195-1 initiates delivery of segment of encrypted content #3 over network 190 through gateway resource 160 to communication device 120-1 assigned network address ABCD. The content management resource 141 initiates storage of the retrieved segment of encrypted content #3 in repository 180.

To retrieve the segment of encrypted content #4, the content management resource 141 generates and transmits a request to the entity (location such as server resource 195-1) as specified by resource locator RL14 through gateway resource 160 and network 190 to server resource 195-1. In response to receiving the request, in a reverse direction, the server resource 195-1 initiates delivery of segment of encrypted content #4 over network 190 through gateway resource 160 to communication device 120-1 assigned network address ABCD. The content management resource 141 initiates storage of the retrieved segment of encrypted content #4 in repository 180.

In addition to initiating storage of the encrypted segments of content, the content management resource 141 in the user-operated communication device 120-1 initiates storage of copies of the original decryption key information 112 required to decrypt the encrypted segments of content for later retrieval. In one example embodiment, this includes notifying the content management resource 141 to store copies of the original decryption key information 112 on behalf of the subscriber for later use.

In accordance with further embodiments, in response to receiving the notification to store the decryption key information 112 for later use, and on behalf of the user 108-1 and client device 120-1 (subscriber), the server resource 195-2 operated by a service provider (such as an entity distributing the encrypted segments of content) stores the copies of the original decryption key information 112-C in repository 181. As shown, the repository 181 dedicated for storing copies of decryption key information resides at a remote location with respect to the user operated communication device 120-1.

In this example embodiment, the decryption key information 112 includes decryption key D_KEY1, D_KEY2, D_KEY3, D_KEY4, etc. As previously discussed, because each of these decryption keys in decryption key information 112 may not be available for retrieval at a later time when the user 108-1 wishes to play back the corresponding recorded content, the content management resource 141 can be configured to notify the server resource 195-2 to store respective decryption keys in repository 181 as each of the segments of encrypted content are retrieved from server resource 195-1.

More specifically, in one embodiment, at or around time of retrieving segment of encrypted content #1 at the location as specified by RL11, the communication device 120-1 utilizes the content access information 185-1 to identify that resource location as specified by RL21 indicates the location of where corresponding decryption key D_KEY1 (for decrypting the segment of encrypted content #1) is stored. Because the requested content 110 is being stored in repository 180 for later retrieval, via communications through the gateway resource 160 and over network 190, the content management resource 141 notifies key management resource 142 associated with server resource 195-2 to store the corresponding decryption key D_KEY1 for later retrieval by the user 108-1 (and potentially on behalf of other users that also record encrypted content 110). In this example embodiment, the key management resource 142 stores the decryption key D_KEY1 in repository 181 at a corresponding location as specified by RL41.

In accordance with further embodiments, the key management resource 142 (or other suitable resource associated with server resource 195-2) notifies the content management resource 141 where the decryption key D_KEY1 is stored in repository 181. In this example embodiment, the key management resource 142 notifies the content management resource 141 that the decryption key D_KEY1 is stored at a location as specified by resource locator RL41.

The content manager resource 141 utilizes the received information (resource locator RL41) to create content access information 185-2 is shown in FIG. 3. For example, in one embodiment, the content management resource 141 creates the content access information 185-2 such that the corresponding user 108-1 and communication device 120-1 are able to play back the repository 180 at a later time.

It should be noted that the content access information 185-2 bears a resemblance to the content access information 185-1. For example, both content access information 185-2 and content access information 185-1 include instructions enabling play back of corresponding content 110 on display screen 130 of the communication device 120-1. However, because the encrypted content 110 may no longer be available from server resource 195-1 at a later time, embodiments herein include creating content access information 185-2 indicating new locations of recorded segments of encrypted content as well as corresponding decryption key information for playing back the content at a later time.

In this example embodiment, as shown in FIG. 3, the content manager resource 141 (or other suitable resource) keeps track of where segment of encrypted content #1 is stored in repository 180. In this example embodiment, the segment of encrypted content #1 is stored at a location as specified by resource locator RL31. Additionally, as previously discussed, the key manager resource 142 provides notification to content management resource 141 of resource locator RL41, which specifies the location indicating where the corresponding copy of the decryption key D_KEY1 is stored in repository 181. The content manager resource 141 stores the received resource locator RL41 in the first entry of content access information 185-2 and associates it with the resource locator RL31, which identifies the respective location in repository 180 where the copy of the segment of encrypted content #1 is stored in repository 180.

In one embodiment, each of the one or more keys in decryption key information 112 is encrypted for security reasons. If desired, the key management resource 142 initiates storage of the encrypted decryption keys in repository 181 as shown. Alternatively, note that the key management resource 142 can initiate storage of decryption key information in repository 181 as non-encrypted decryption key information.

As previously discussed, the content management resource 141 also initiates retrieval of segment of encrypted content #2 stored at a location as specified by resource locator RL12 for recording in repository 180. In addition to retrieving segment of encrypted content #2, the content management resource 141 utilizes the content access information 185-1 to identify that resource location as specified by RL22 indicates the location of where corresponding decryption key D_KEY2 (for decrypting the segment of encrypted content #2) is stored. Via communications through the gateway resource 160 and over network 190, the content management resource 141 notifies key management resource 142 associated with server resource 195-2 to store the corresponding decryption key D_KEY2 for later retrieval because the content 110. This may be done automatically in response to the key management resource 142 receiving the notification from content management resource 141 that content management resource 141 is recording the encrypted content 110.

In this instance, because the content 110 is being recorded by the client device 120-1 for later use, the key management resource 142 initiates storage of the decryption key D_KEY2 (stored at location specified by RL32) in repository 181 as part of the copy of decryption key information 112-C associated with the copy of encrypted content 110-C stored in repository 180.

In accordance with further embodiments, the key management resource 142 (or other suitable resource) communicates, to the key management resource 141, the location where the decryption key D_KEY2 is stored in repository 181. In this example embodiment, the key management resource 142 notifies the content management resource 141 that the copy of the decryption key D_KEY2 is stored at a location as specified by resource locator RL42 in repository 181.

In this example embodiment, as shown in FIG. 3, the content manager resource 141 (or other suitable resource) keeps track of where the segment of encrypted content #2 is stored in repository 180. For example, as mentioned, the segment of encrypted content #2 is stored at a location in repository 180 as specified by resource locator RL32. Additionally, as previously discussed, the key management resource 142 provides notification to content management resource 141 of resource locator RL42, which specifies the location indicating where the corresponding copy of the decryption key D_KEY2 is stored in repository 181. The content manager resource 141 stores the received resource locator RL42 in content access information 185-2 and associates it with the resource locator RL32, which identifies the respective location in repository 180 where the stored of the stored segment of encrypted content #1 is stored.

The key management resource 141 receives each of the segments of the encoded content from server resource 195-1 in a similar manner as previously discussed and stores the data in repository 180, keeping track of where the segment of encrypted content are stored. The content management resource 141 also receives information from key management resource 142 where the copy of the decryption key information is stored. The content management resource 141 (or other suitable resource) produces the content access information 185-2 based on such feedback.

As further discussed below, in accordance with further embodiments, the service provider or other suitable resource controls subsequent access to the copies of the original decryption key information 112-C such that the previously recorded segments of the encrypted content 110-C are not used in an improper manner. In other words, as previously discussed, controlling access to the copies of the original decryption key information 112-C prevents improper decryption of the encrypted content by unauthorized parties.

Subsequent to operations of recording of the segments of encrypted content, initiating storage of the decryption key information in repository 181, and creating content access information 185-2 as previously discussed, assume that the user operated communication device 120-1 receives input such as a request from a corresponding subscriber to play back the previously recorded segments of encrypted content. In such an instance, the user operated communication device 120-1 retrieves the content access information 185-2 indicating where each of the previously stored segments of encrypted content is stored in repository 180 and where copies of the decryption keys are located.

In one embodiment, as previously discussed, the content access information 185-2 is generated at or around a time of recording the segments of encrypted content. The content access information indicates (via respective resource locators RL31, RL32 RL33, etc.) locations where the recorded segments of encoded content are stored as well as locations (via respective resource locators RL41, RL42, RL43, etc.) where the corresponding copies of the decryption keys are stored.

Figure 4:
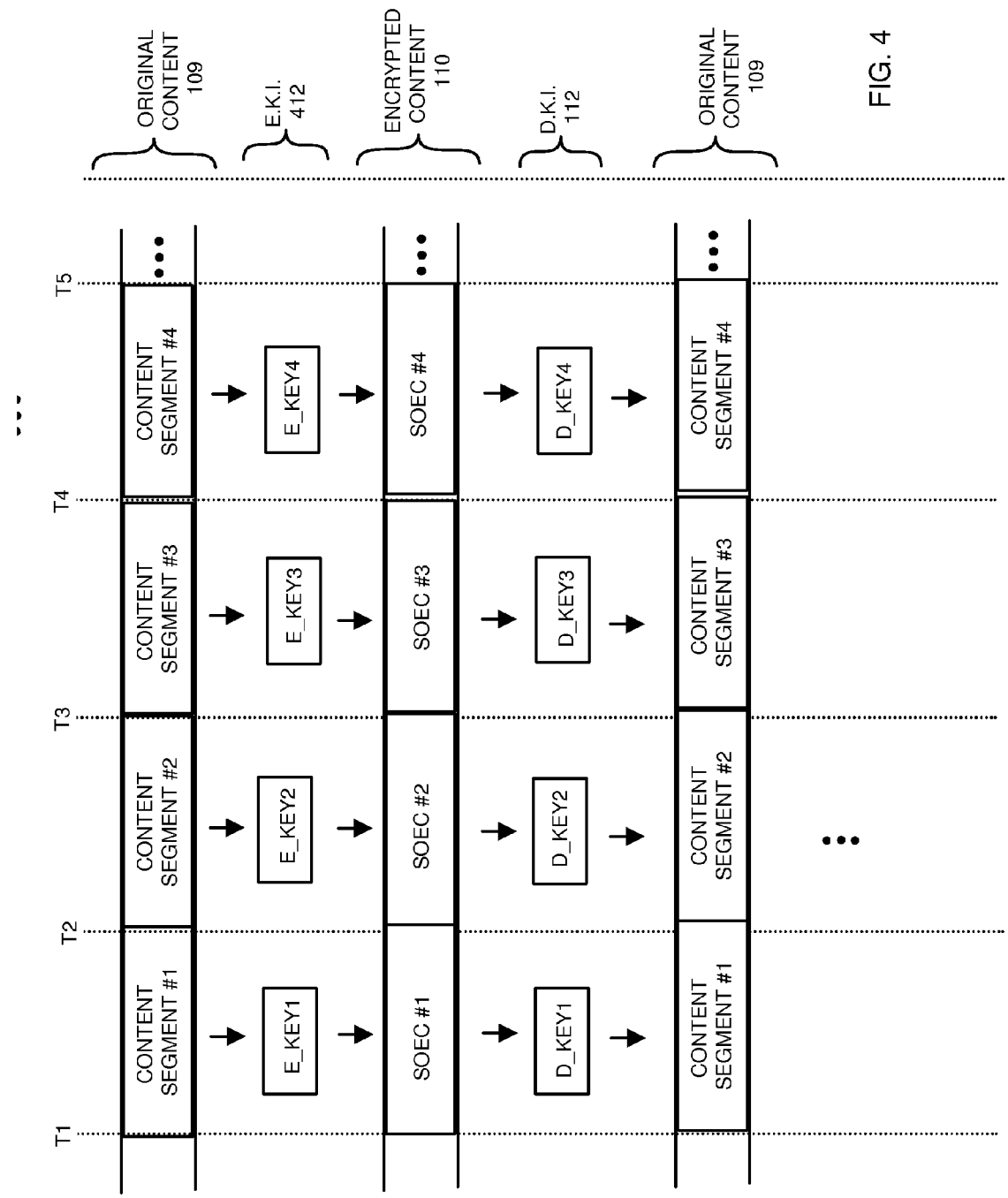
FIG. 4 is an example diagram illustrating use of first key information to encrypt content and second key information to decrypt encrypted content according to embodiments herein.

FIG. 4 is an example diagram illustrating use of first key information to encrypt content and second key information to decrypt encrypted content according to embodiments herein.

As shown, the keys for encrypting the segments of the original content 109 (such as MPEG encoded data) can be rotated over time. For example, the original content 109 can be a stream of video data partitioned into segments subsequently encrypted for distribution. By way of non-limiting example embodiment, the encrypted content 110 can represent one or more titles of content that are scheduled for distribution in a respective one or more timeslots.

In this example embodiment, key management resource 142 (or other suitable entity that produces encrypted content 110) applies first encryption key E_KEY1 to original content segment #1 (corresponding to playback times between T1 and T2) to produce the segment of encrypted content #1; the key management resource 142 applies second encryption key E_KEY2 to original content segment #2 (corresponding to playback times between T2 and T3) to produce the segment of encrypted content #2; the key management resource 142 applies third encryption key E_KEY3 to original content segment #3 (corresponding to playback times between T3 and T4) to produce the segment of encrypted content #3; the key management resource 142 applies fourth encryption key E_KEY4 to original content segment #4 (corresponding to playback times between T4 and T5) to produce the segment of encrypted content #4; and so on.

As further shown, embodiments herein include generating corresponding decryption keys to decrypt each of the segments of encrypted content. For example, key management resource 142 generates decryption key D_KEY1 to decrypt the segment of encrypted content #1 back into original content segment #1; key management resource 142 generates decryption key D_KEY2 to decrypt the segment of encrypted content #2 back into original content segment #2; key management resource 142 generates decryption key D_KEY3 to decrypt the segment of encrypted content #3 back into original content segment #3; key management resource 142 generates decryption key D_KEY4 to decrypt the segment of encrypted content #4 back into original content segment #4; and so on.

Note that each of the segments can include multiple sub-segments encoded using a respective encryption key. For example, content segment #1 can include a first grouping of multiple sub-segments of content that are encrypted using E_KEY1 to produce segment of encrypted content #1 content segment #2 can include a second grouping of multiple sub-segments of content that are encrypted using E_KEY2 to produce segment of encrypted content #2; content segment #3 can include a third grouping of multiple sub-segments of content that are encrypted using E_KEY3 to produce segment of encrypted content #3; and so on.

In such an instance, each of the segments of the encrypted content 110 has a corresponding decryption key in which to decrypt each of the multiple groupings. For example, the first grouping of sub-segments of content in segment of encrypted content #1 are decrypted using D_KEY1 to produce respective groupings in segment of content #1; the second grouping of sub-segments in segment of encrypted content #2 are decrypted using D_KEY2 to produce respective groupings in segment of content #2; the third grouping of sub-segments in segment of encrypted content #3 are decrypted using D_KEY3 to produce respective groupings in segment of content #3; and so on.

As mentioned, changing and/or rotating encryption keys applied to the segments of content over time helps to ensure that proprietary content is not misappropriated.

Figure 5:
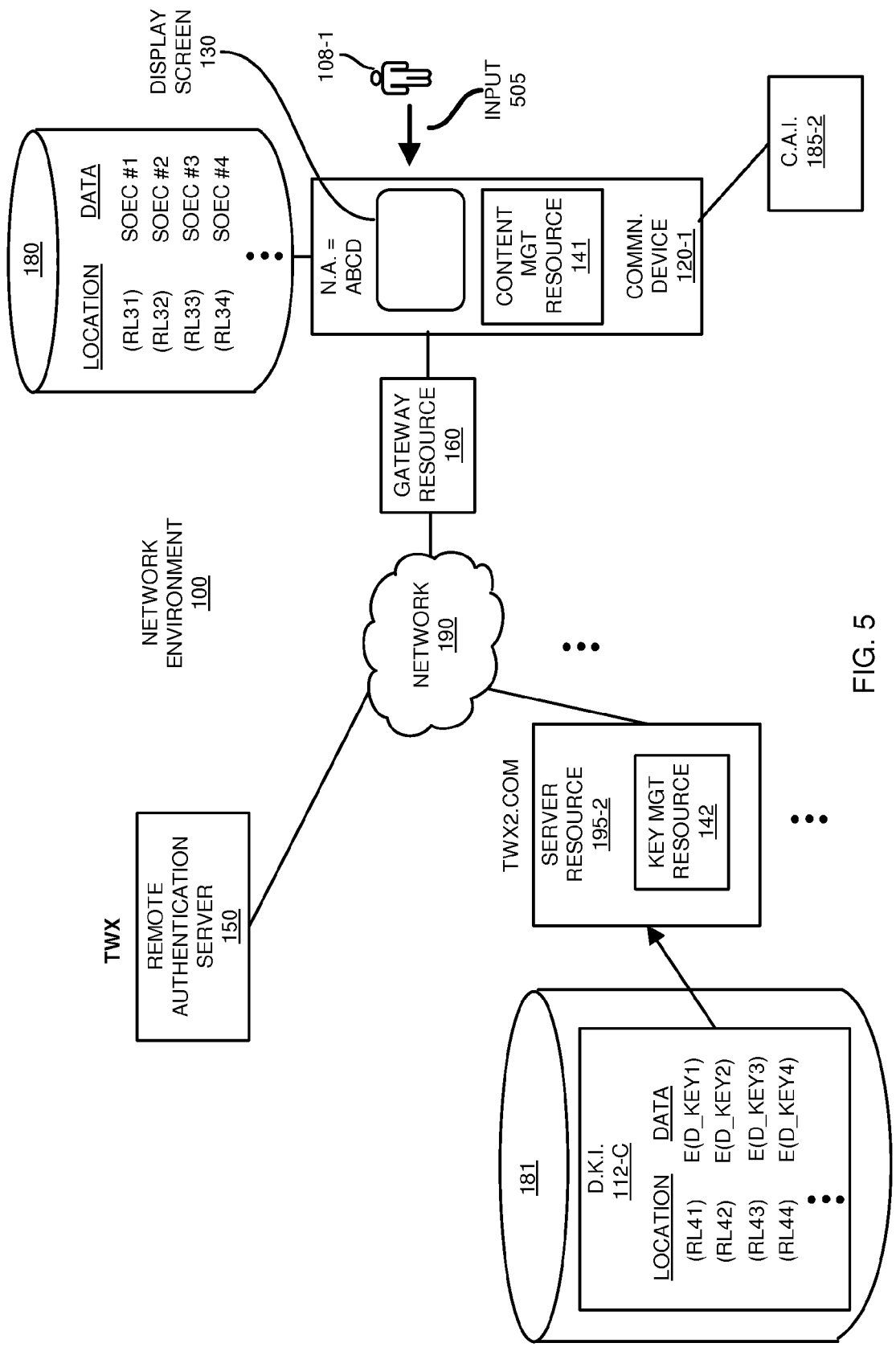
FIG. 5 is an example diagram illustrating distribution of key information and playback of content according to embodiments herein.

FIG. 5 is an example diagram illustrating distribution of key information and playback of content according to embodiments herein.

Using the content access information 185-2, assume that the user-operated communication device 120-1 initiates playback of the stored segments of encrypted content in repository 180. The content access information 185-1 indicates an order in which to playback the segments of content.

For example, as shown, assume that the user 108-1 produces input 505 instructing the communication device 120-1 to play back previously recorded content 110 in repository 180 on display screen 130. As previously discussed, the key management resource 142 stores the copies of the decryption key information 112-C (decryption keys D_KEY1, D_KEY2, D_KEY3, D_KEY4, etc.) in a secure location (such as in repository 180) with respect to the user 108-1.

To obtain the copies of the decryption key information 110-2 as specified by the content access information 185-2, the content management resource 141 may be required to first communicate the user's and/or communication device's assigned credentials to authentication server resource 150 operated by the service provider TWX. On behalf of the service provider TWX, the remote authentication server resource 150 determines, based on credentials, whether the corresponding subscriber (user 108-1) is authorized to playback the requested content.

Assume that the communication device 120-1 provides the appropriate credentials to remote authentication server resource 150.

Subsequent to authentication of the subscriber by the authentication server resource 150, the communication management resource 141 utilizes the content access information the content access information 185-2 to initiate retrieval of the corresponding segments of encrypted content as specified by the content access information 185-2 to playback a rendition of the original content.

For example, the content access information 185-2 indicates that the segment of encrypted #1 is the first segment to playback and is available from the location in repository 180 as specified by resource locator RL31. The content management resource 141 uses the resource locator RL31 to initiate retrieval of the segment of encrypted content #1 (one or more groupings of sub-segments of content) from repository 180.

Additionally, as specified by the content access information 185-2, to play back the segment of encrypted content #1, the content management resource 141 communicates through gateway resource 160 and over network 190 to key management resource 142 to retrieve the decryption key D_KEY1 from the location specified by resource locator RL41 in repository 181. In one embodiment, the server resource 195-2 and content management resource 141 first establish a secured communication link over which the copy of decryption key information 112-C is conveyed to the communication device 120-1.

In response to receiving the request for the decryption key at the location specified by resource locator RL41, the key management resource 142 retrieves the encrypted decryption key D_KEY1 and forwards it over network 190 through gateway resource 160 to the communication device 120-1.

In one embodiment, the communication device 120-1 receives an appropriate decryption key (such as from remote authentication server 150, server resource 195-2, or other suitable entity) to decrypt the decryption key information 112-C that the content manager resource 141 receives from the server resource 195-2. The content management resource 141 applies the appropriate decryption key to decrypt the received message from the key management resource 142 to produce decryption key D_KEY1. The content management resource 141 then applies the decryption key D_KEY1 to the retrieved segment of encrypted content #1 (such as a duration of encrypted video) from repository 180 to produce the original segment of content #1 for playback on the respective display screen 130.

In one embodiment, while the content management resource 141 buffers and/or plays back the original segment of content #1 associated with the first segment of content 110, the content management resource 141 uses the content access information 185-2 to further identify that the next segment of encrypted content #2 in the corresponding sequence is available from the location in repository 180 as specified by resource locator RL32. The content management resource 141 initiates retrieval of the segment of encrypted content #2 from repository 180.

Additionally, as specified by the content access information 185-2, and resource locator RL42, the content management resource 141 communicates through gateway resource 160 and over network 190 to server resource 195-2 to retrieve the decryption key D_KEY2 from the location specified by resource locator RL42 in repository 181.

In response to receiving the request for the decryption key at the location specified by resource locator RL42, the key management resource 142 retrieves the encrypted decryption key D_KEY2 and forwards it over network 190 through gateway resource 160 to the communication device 120-1.

The content management resource 141 applies the appropriate decryption key to decrypt the received message from the key management resource 142 into decryption key D_KEY2. The content management resource 141 then applies the decryption key D_KEY2 to the retrieved segment of encrypted content #2 from repository 180 to reproduce produce the original segment of content #2 for playback on the respective display screen 130.

In one embodiment, while the content management resource 141 buffers and/or plays back the original segment of content #2 associated with the first segment of content 110, the content manager resource 141 uses the content access information 185-2 to identify that the next segment of encrypted content #3 in the corresponding sequence is available from the location in repository 180 as specified by resource locator RL33. The content management resource 141 initiates retrieval of the segment of encrypted content #3 from repository 180.

Additionally, as specified by the content access information 185-2, and resource locator RL43, the content management resource 141 communicates through gateway resource 160 and over network 190 to server resource 195-3 to retrieve the decryption key D_KEY3 from the location specified by resource locator RL43 in repository 181.

In response to receiving the request for the decryption key at the location specified by resource locator RL43, the key management resource 142 retrieves the encrypted decryption key D_KEY3 and forwards it over network 190 through gateway resource 160 to the communication device 120-1.

The content manager resource 141 applies an appropriate decryption key to decrypt the received message from the key management resource 142 into decryption key D_KEY3. The content management resource 141 then applies the decryption key D_KEY3 to the retrieved segment of encrypted content #3 to produce the original segment of content #3 for playback on the respective display screen 130.

Accordingly, in this manner, the communication device 120-1 can be configured to initiate recording of encrypted data and then use stored decryption key information to decrypt the encrypted data and play back on a respective display screen 130 at a later time.

Note again that embodiments herein can be implemented in any of multiple different types of digital management applications. For example, in one embodiment, the user 108-1 subscribes to use of an Internet Protocol Digital Video Recorder (IP-DVR) in which the IP-DVR (including repository 180) simply records segments of encrypted content such as live streams of data in repository 180 for later playback. As previously discussed, in one embodiment, the encryption keys associated with generating the live stream (such as encrypted content 110) rotate over time. Copying of the encrypted content 110 as well as copying of corresponding decryption key information enables the subscriber to play back of the recording of encrypted content at a later time as described herein.

Figure 6:
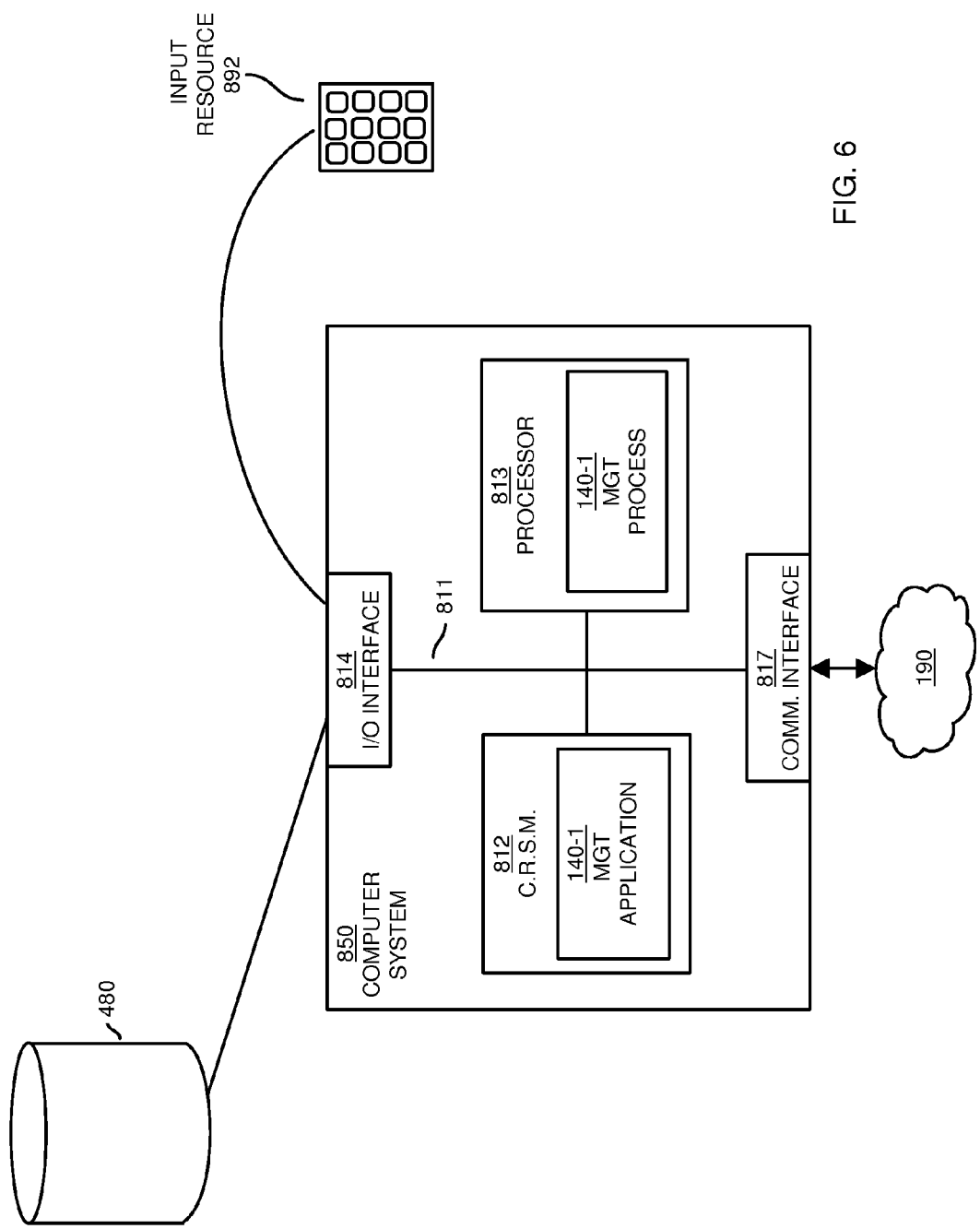
FIG. 6 is an example diagram illustrating a computer system to carry out operations according to embodiments herein.

FIG. 6 is a diagram illustrating an example computer architecture in which to execute any of the functionality according to embodiments herein. Any of the different processing techniques such as those provided by content management resource 141, key management resource 142, etc., can be implemented via execution of software code on computer processor hardware.

For example, as shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 can further include processor 813 (i.e., computer processor hardware such as one or more processor co-located or disparately located processor devices with respect to each other), I/O interface 814, communications interface 817, etc.

Computer system 850 can be located at any suitable locations in network environment 100 to carry out the operations as discussed herein. For example, computer processor hardware (i.e., processor 813 and/or computer system 850) and/or management application 140-1 can be located in a single location or can be distributed amongst multiple locations. As mentioned, management application 140-1 can be configured to execute the operations as discussed with respect to content management resource 141, key management resource 142, any of server resources 195, communication device 120-1, etc.

As its name suggests, I/O interface 814 provides connectivity to resources such as repository 480, input resource 892, one or more display screens, etc.

Computer readable storage medium 812 can be any hardware storage device to store data such as memory, optical storage, hard drive, floppy disk, etc. In one embodiment, the computer readable storage medium 812 stores instructions and/or data associated with management application 140-1.

Communications interface 817 enables the computer system 850 and processor resource 813 to communicate over a resource such as network 190. I/O interface 814 enables processor resource 813 to access data from a local or remote location, control a respective display screen, receive input, output communications, etc.

As shown, computer readable storage media 812 can be encoded with management application 140-1 (e.g., software, firmware, etc.) executed by processor 813. Management application 140-1 can be configured to include instructions to implement any of the operations as discussed herein associated with the communication device 120-1, server resource 195-1, server resource, 195-2, etc.

During operation of one embodiment, processor 813 accesses computer readable storage media 812 via the use of interconnect 811 in order to launch, run, execute, interpret or otherwise perform the instructions in management application 140-1 stored on computer readable storage medium 812.

Execution of the management application 140-1 produces processing functionality such as management process 140-2 in processor resource 813. In other words, the management process 140-2 associated with processor resource 813 represents one or more aspects of executing management application 140-1 within or upon the processor resource 813 in the computer system 850.

Those skilled in the art will understand that the computer system 850 can include other processes and/or software and hardware components, such as an operating system that controls allocation and use of hardware resources to execute management application 140-1.

In accordance with different embodiments, note that computer system may be any of various types of devices, including, but not limited to, communication device, a server resource, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 850 may reside at any location or multiple locations in network environment 100. The computer system 850 can be included in any suitable resource in network environment 100 to implement any of the functionality as discussed herein.

Note that each of the other functions as discussed herein can be executed in a respective computer system based on execution of corresponding instructions. For example, communication device can include respective computer readable storage medium and processor hardware to execute the operations performed by communication device 110-1.

Functionality supported by the different resources will now be discussed via flowcharts in FIGS. 7 and 8. Note that the steps in the flowcharts below can be executed in any suitable order.

Figure 7:
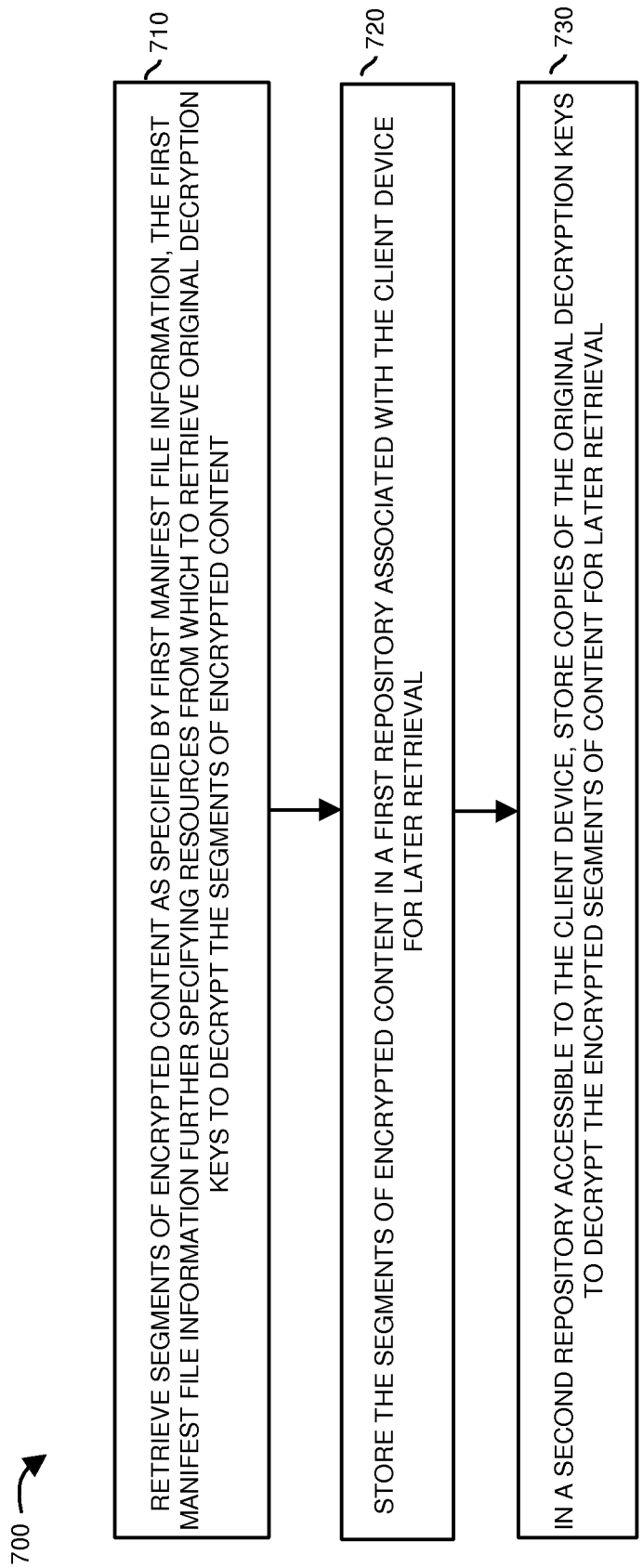
FIG. 7 is an example diagram illustrating a method according to embodiments herein.

FIG. 7 is a flowchart 700 illustrating an example method according to embodiments. Note that there will be some overlap with respect to concepts as discussed above.

In processing operation 710, the content management resource 141 initiates retrieval of a segment of encrypted content 110 as specified by content access information 185-1. The content access information 185-1 specifies resources from which to retrieve copies of original decryption keys D_KEY1, D_KEY2, D_KEY3, etc., to decrypt the segments of encrypted content stored in repository 180.

In processing operation 720, the content management resource 141 initiates storage of the retrieved segments of encrypted content 110 in repository 180 for later retrieval.

In processing operation 730, the key management resource 142 initiates storage of copies of the original decryption keys (i.e., decryption key information 112-C) in repository 181 for later retrieval and playback of the encrypted content 110-C stored in repository 180.

Figure 8:
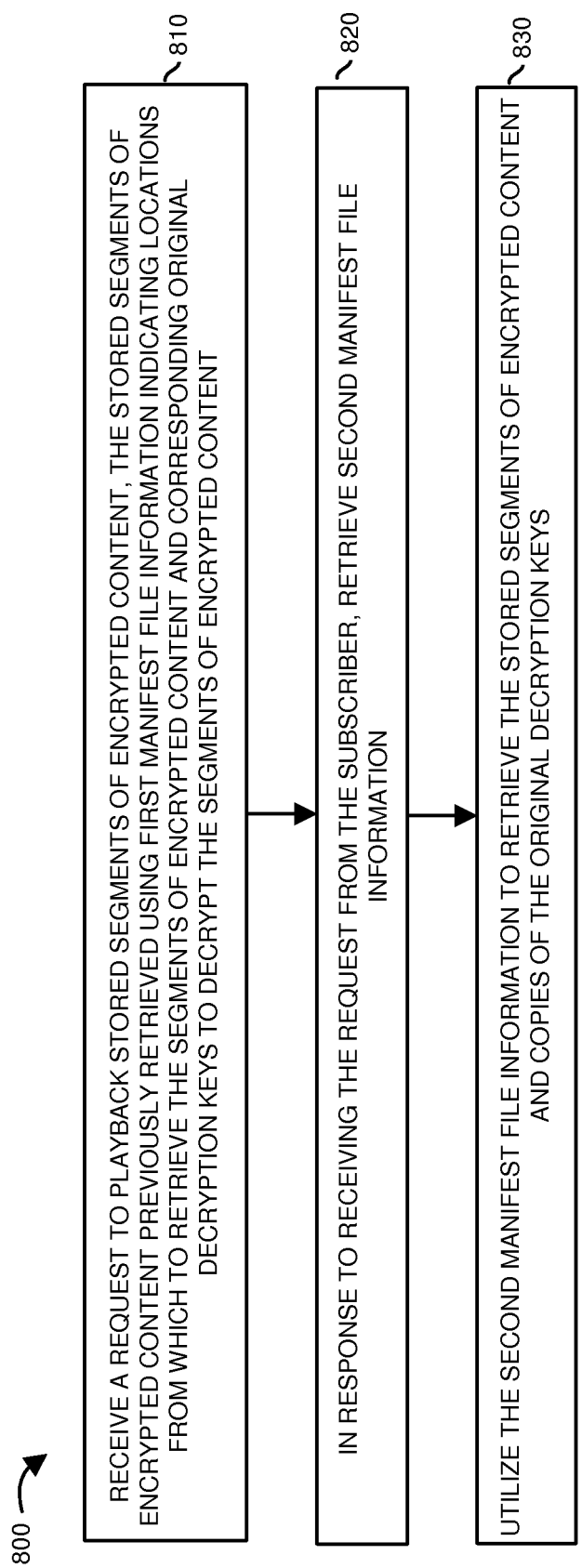
FIG. 8 is an example diagram illustrating a method according to embodiments herein.

FIG. 8 is a flowchart 800 illustrating an example method according to embodiments. Note that there will be some overlap with respect to concepts as discussed above.

In processing operation 810, the content management resource 141 receives a request to play back stored segments of encrypted content 110-C. As previously discussed, the stored segments of encrypted content 110-C were previously retrieved using content access information 185-1 (first content access information) indicating locations from which to retrieve the segments of encrypted content 110-C and corresponding copy of original decryption key information 112-C to decrypt the segments of encrypted content.

In processing operation 820, in response to receiving the request from the subscriber (i.e., user 108-1), the content management resource 141 retrieves content access information 185-2 (second content access information).

In processing operation 830, the content management resource 141 utilizes the content access information 185-2 to retrieve the stored segments of encrypted content 110-C in repository 180 and retrieve copies of the original decryption key information 112-C (including D_KEY1, D_KEY2, D_KEY3, D_KEY4, etc.).

Note again that techniques herein are well suited for controlling distribution and playback of encrypted content. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   via computer processor hardware in a network including a client device and a server resource that serves data to the client device:
   retrieving segments of encrypted content as specified by first content access information, the first content access information further specifying resources from which to retrieve original decryption keys to decrypt the segments of encrypted content;
   storing the segments of encrypted content in a first repository associated with the client device for later retrieval;
   retrieving the original decryption keys;
   in a second repository accessible to the client device, storing copies of the original decryption keys for later retrieval, the second repository disparately located with respect to the first repository, the copies of the original decryption keys available to decrypt the encrypted segments of content stored in the first repository; and
   deriving second content access information to specify locations of the copies of the original decryption keys in the second repository, the second content access information providing mapping between the stored segments of encrypted content in the first repository and corresponding copies of the original decryption keys in the second repository.

2. The method as in claim 1, wherein the encrypted segments of content is content selected for recording by a user in a subscriber domain of a cable network environment in which the client device resides, the selected content scheduled for distribution in a particular timeslot.

3. The method as in claim 1 further comprising:
   retrieving the first content access information in response to receiving selection of particular content for recording and subsequent playback at a later time; and
   producing the second content access information in response to receiving a request to record the particular content.

4. The method as in claim 1, wherein the segments of encrypted content includes a first segment of encrypted content and a second segment of encrypted content, a first decryption key assigned to the first segment of encrypted content, the first decryption key configured to decrypt the first segment of encrypted content, a second decryption key assigned to the second of segment of encrypted content, the second decryption key configured to decrypt the second segment of encrypted content.

5. The method as in claim 4, wherein storing copies of the original decryption keys further comprises:
   retrieving the first decryption key from storage;
   storing a copy of the first decryption key at a first location in the second repository;
   retrieving the second decryption key from storage; and
   storing a copy of the second decryption key at a second location in the second repository.

6. The method as in claim 5 further comprises:
   producing the second content access information to indicate a location of the first segment of encrypted content and the second segment of encrypted content stored in the first repository;
   producing the second content access information to further indicate the first location from which a copy of the first decryption key is retrievable from the second repository, the second content access information mapping the first decryption key to the first segment of encrypted content; and producing the second content access information to further indicate a second location from which a copy of the second decryption key is retrievable from the second repository, the second content access information mapping the second decryption key to the second segment of encrypted content.

7. The method as in claim 1 further comprising:

in response to receiving a command to play back the stored segments of encrypted content in the first repository:

utilizing the second content access information to identify an ordering of playing back renditions of the stored segments of encrypted content;

utilizing the second content access information to identify locations of the copies of original decryption keys corresponding to the stored segments of encrypted content; and retrieving the copies of original decryption keys from the locations as specified by the second content access information.

8. The method as in claim 1 further comprising:

at the client device, as specified by the second content access information:

i) initiating retrieval of the stored segments of encrypted content from the first repository, the first repository located in a subscriber domain in which the client device resides;

ii) establishing a secured communication link to access the second repository; and iii) initiating retrieval of the copies of original decryption keys from the second repository over the secured communication link.

9. The method as in claim 8, wherein the client device requires authorization from a content distribution service provider providing access to the encrypted segments of content to access the copies of the original decryption keys from the second repository upon a subsequent request by the client device to playback a rendition of the encrypted segments of content stored in these first repository.

10. The method as in claim 1, wherein the copies of the original decryption keys are available from the second repository after the original decryption keys become unavailable for retrieval by the client device.

11. The method as in claim 1 further comprising:

retrieving the original decryption keys and storing the copies of the original decryption keys in the second repository in anticipation of the client device requesting playback of the segments of encrypted content stored in the first repository.

12. The method as in claim 1 further comprising:

retrieving the original decryption keys and storing the copies of the original decryption keys in the second repository in response to detecting retrieval and storage of the segments of encrypted content to the first repository for later playback by the client device.

13. The method as in claim 1, wherein the second repository is a remotely located resource accessible to the client device subsequent to authentication of the client device to access the copies of the original decryption keys stored in the second repository through the server resource, the server resource operable to serve the copies of the original decryption keys to the client device.

14. The method as in claim 1, wherein retrieving segments of encrypted content includes retrieving the segments of encrypted content from a first location in which the segments of encrypted content are stored, the first repository disparately located with respect to the first location from which the segments of encrypted content are retrieved; and wherein retrieving the original decryption keys includes retrieving the original decryption keys from a second location in which the original decryption keys are stored, the second repository disparately located with respect to the second location from which the original decryption keys are retrieved.

15. The method as in claim 14, wherein the copies of the original decryption keys are available from the second repository after the original decryption keys become unavailable for retrieval by the client device.

16. The method as in claim 1, wherein the copies of the original decryption keys includes a copy of a first decryption key and a copy of a second decryption key, the copy of the first decryption key assigned to decrypt a first encrypted segment of content stored in the first repository, a copy of the second decryption key assigned to decrypt a second encrypted segment of content stored in the first repository.

17. The method as in claim 1 further comprising:

storing the segments of encrypted content in the first repository and storing copies of the original decryption keys for later retrieval in response to receiving input from a subscriber having access to the segments of encrypted content as specified by first content access information.

18. A method comprising:

via computer processor hardware in a playback device:

receiving a request to playback segments of encrypted content stored in a first repository, the stored segments of encrypted content previously retrieved using first content access information indicating: i) first locations from which to retrieve the segments of encrypted content and ii) corresponding original decryption keys to decrypt the segments of encrypted content;

in response to receiving the request from the subscriber, retrieving second content access information; and utilizing the second content access information to identify second locations from which to retrieve the stored segments of encrypted content in the first repository and copies of the corresponding original decryption keys from a second repository, the second repository disparately located with respect to the first repository, the second content access information providing mapping between the stored segments of encrypted content in the first repository and copies of the corresponding original decryption keys in the second repository.

19. The method as in claim 18 further comprising:

prior to receiving the request to playback stored segments of encrypted content, receiving input from the subscriber requesting to record the content, the segments of encrypted content previously retrieved by the playback device on behalf of the subscriber using the first content access information, the first content access information used to identify the first locations in order to store the copies of the corresponding original decryption keys to the second locations.

20. The method as in claim 19 further comprising:
applying retrieved copies of the corresponding original decryption keys to the retrieved stored segments of encrypted content to play back the content on the playback device.

21. The method as in claim 18, wherein the copies of the corresponding original decryption keys are stored at a remote location with respect to the playback device, the method further comprising:
communicating credentials to an authentication server resource operated by a content distribution service provider making the segments of encrypted content available to the subscriber; and
subsequent to authentication of the subscriber by the authentication server resource, receiving the copies of the original decryption keys associated with the stored segments of encrypted content previously retrieved on behalf of the subscriber.

22. The method as in claim 21, wherein the received copies of the original decryption keys are encrypted, the method further comprising:
receiving decryption information from a server resource over a network connection; and
applying the decryption information to the received copies of the original decryption keys.

23. A computer system comprising:
a first repository;
computer processor hardware operable to:
retrieve segments of encrypted content as specified by first content access information, the first content access information further specifying resources from which to retrieve original decryption keys to decrypt the segments of encrypted content;
store the segments of encrypted content in the first repository associated with a client device for later retrieval; and
in a second repository accessible to the client device, store copies of the original decryption keys for later retrieval to decrypt the encrypted segments of content, the second repository disparately located with respect to the first repository; and
derive second content access information to specify locations of the copies of the original decryption keys in the second repository, the second content access information providing mapping between the stored segments of encrypted content in the first repository and corresponding copies of the original decryption keys in the second repository.

24. The computer system as in claim 23, wherein the segments of encrypted content includes a first grouping of multiple segments of encrypted content and a second grouping of multiple segments of encrypted content, a first decryption key assigned to the first grouping of segments of encrypted content, the first decryption key configured to decrypt the first grouping of segments of encrypted content, a second decryption key assigned to the second grouping of segments of encrypted content, the second decryption key configured to decrypt the second grouping of segments of encrypted content.

25. The computer system as in claim 24, wherein the computer processor hardware is further operable to:
retrieve a copy of the first decryption key;
store a copy of the first decryption key at a first location in the second repository;
retrieve a copy of the second decryption key; and
store a copy of the second decryption key at a second location in the second repository.

26. The computer system as in claim 24, wherein the computer processor hardware is further operable to:
produce the second content access information to indicate locations of the first grouping of segments of encrypted content and the second grouping of segments of encrypted content stored in the first repository;
produce the second content access information to indicate the first location from which a copy of the first decryption key is retrievable from the second repository, the second content access information mapping the first grouping of multiple segments of encrypted content to the copy of the first decryption key; and
produce the second content access information to indicate a second location from which a copy of the second decryption key is retrievable from the second repository, the second content access information mapping the second grouping of multiple segments of encrypted content to the copy of the second decryption key.

27. The computer system as in claim 23, wherein the computer processor hardware is further operable to:
in response to receiving a command to play back the stored segments of encrypted content in the first repository:
utilize the second content access information to identify an ordering of playing back renditions of the stored segments of encrypted content;
utilize the second content access information to identify locations of the copies of original decryption keys corresponding to the stored segments of encrypted content; and
retrieve the copies of original decryption keys from the locations as specified by the second content access information.

28. The computer system as in claim 23, wherein the computer processor hardware is further operable to:
at the client device, as specified by the second content access information:
i) initiate retrieval of the stored segments of encrypted content from the first repository, the first repository located in a subscriber domain in which the client device resides;
ii) establish a secured communication link to access the second repository; and
iii) initiate retrieval of the copies of original decryption keys over the secured communication link from the second repository;
wherein the client device requires authorization from a content distribution service provider providing access to the encrypted segments of content to access the copies of the original decryption keys from the second repository upon a subsequent request by the client device to playback a rendition of the encrypted segments of content stored in the first repository.

29. Computer-readable storage hardware having instructions stored thereon, the instructions, when carried out by computer processor hardware, cause the computer processor hardware to:
retrieve segments of encrypted content as specified by first content access information, the first content access information further specifying resources from which to retrieve original decryption keys to decrypt the segments of encrypted content;
store the segments of encrypted content in a first repository associated with the client device for later retrieval;
in a second repository accessible to the client device, store retrieved copies of the original decryption keys to decrypt the encrypted segments of content for later retrieval, the second repository disparately located with respect to the first repository; and derive second content access information to specify locations of the copies of the original decryption keys in the second repository, the second content access information providing mapping between the stored segments of encrypted content in the first repository and corresponding copies of the original decryption keys in the second repository.

* * * * *